US009087430B2

(12) United States Patent
Borissov et al.

(10) Patent No.: US 9,087,430 B2
(45) Date of Patent: Jul. 21, 2015

(54) ARCHITECTURE FOR SERVER-BASED CASINO GAMING MACHINE SYSTEM

(76) Inventors: Milo Borissov, Dubai Sports (AE); Rossi McKee, Indianapolis, IN (US); Manol Atanassov Roujinov, Nishava (BG)

( * ) Notice: Subject to any disclaimer, the term of this patent is extended or adjusted under 35 U.S.C. 154(b) by 206 days.

(21) Appl. No.: 13/452,393

(22) Filed: Apr. 20, 2012

(65) Prior Publication Data

US 2013/0281183 A1 Oct. 24, 2013

(51) Int. Cl.
*A63F 13/00* (2014.01)
*G07F 17/32* (2006.01)

(52) U.S. Cl.
CPC ........ *G07F 17/3227* (2013.01); *G07F 17/3223* (2013.01)

(58) Field of Classification Search
CPC ........... A63F 2300/20; A63F 2300/209; A63F 2300/40; A63F 2300/402; A63F 2300/50; A63F 2300/51; A63F 2300/531; G07F 17/3225
USPC .............................. 463/16, 20, 29, 40, 42, 43
See application file for complete search history.

(56) References Cited

U.S. PATENT DOCUMENTS

| | | | | |
|---|---|---|---|---|
| 8,012,015 | B2 | 9/2011 | Alderucci | |
| 2005/0221898 | A1 | 10/2005 | Gatto et al. | |
| 2008/0026829 | A1* | 1/2008 | Martin et al. | 463/25 |
| 2008/0274785 | A1* | 11/2008 | Byng et al. | 463/20 |
| 2009/0036203 | A1 | 2/2009 | Anderson et al. | |
| 2010/0105454 | A1 | 4/2010 | Weber et al. | |
| 2010/0113148 | A1* | 5/2010 | Haltovsky et al. | 463/30 |
| 2010/0124990 | A1* | 5/2010 | Crowder | 463/42 |
| 2010/0167822 | A1* | 7/2010 | Crumby | 463/42 |
| 2011/0269529 | A1 | 11/2011 | Baerlocher | |
| 2012/0021835 | A1 | 1/2012 | Keller et al. | |

* cited by examiner

*Primary Examiner* — James S McClellan
(74) *Attorney, Agent, or Firm* — Weide & Miller, Ltd.

(57) ABSTRACT

A server-based gaming system includes a plurality of gaming machines or terminals, at least one gaming terminal control server and one or more game servers, where game processes and system/machine processes are separated. The gaming terminals have separate game process layers and machine or system process layers. Integration of the game processes and machine processes is effected via the gaming terminal control server. The system allows the gaming terminals to execute generic game code or game code configured in accordance with varying protocols, rather than a single, proprietary protocol.

23 Claims, 3 Drawing Sheets

ARCHITECTURE FOR SERVER-BASED CASINO GAMING MACHINE SYSTEM

FIELD OF THE INVENTION

The present invention relates to server-based casino gaming machines and systems.

BACKGROUND OF THE INVENTION

Traditional casino-style slot machines, such as slot and video poker machines, were configured as independently operable machines. For example, each slot machine was configured with a set of reels and a controller which determined an outcome or stopping position for the reels. Each video poker machine was configured with a controller which caused game information, such as images of cards, to be determined and displayed on a display of the machine. The controllers of these gaming machines were configured to be "stand-alone", meaning that they were capable of generating game outcomes by themselves (i.e. without input or control by an external device or system). For example, the gaming controller of a video poker machine might include a random number generator for randomly determining game outcomes and software for generating images of cards based upon each randomly determined outcome. FIG. 1A illustrates such a configuration wherein a first stand-alone gaming machine is configured to present a slot game and a separate stand-alone gaming machine is configured to present a video poker game.

One advantage of the configuration of these traditional gaming machines is that they can easily be set up to operate anywhere. In particular, because they machines are free-standing, they do not need to be connected to other machines or systems. However, these machines have various disadvantages. For example, because the gaming machines are custom-created to present one or more games in a stand-alone fashion, the gaming machines can only present those one or more pre-defined games. Thus, if new and more exciting games are developed, the existing gaming machines cannot be configured to present those new games without entirely re-configuring or re-programming the machines. Also, because each gaming machine must include all of the components necessary to present games in a free-standing manner, each gaming machine is very complex and expensive.

In recent years, server-based gaming systems have been developed. FIG. 1B illustrates one example of such a system. As illustrated, these systems include one or more main game servers and a plurality of gaming machines which are linked to the game server. Each gaming machine may be configured as a kiosk or terminal which communicates with the game server. This configuration has a number of advantages. First, each gaming machine may present various different games as determined by the game server (e.g. Games A, B, C . . . as illustrated in FIG. 1B). For example, the game server may include a menu of games, which menu may change over time, wherein the gaming machines may present any of the games on the menu. In one embodiment, game code corresponding to the games which are supported by the game server may be downloaded to the gaming machines from the game server, which code may be varied from time to time to permit the gaming machines to present different games. In another configuration, the gaming machines or terminals may not even require all of the game code. For example, in one configuration, the game server may execute the game code and generate corresponding game outcomes and then transmit the outcomes to the gaming machines. The gaming machines may then simply present the game outcomes to the players of those machines.

The new server-based casino gaming system thus has the advantage that new games can be implemented more quickly. As indicated above, traditional gaming machines could only present new games by taking the machines out of service and then completely reconfiguring and/or reprogramming them to present a new game or games. In the server-based model, software for a new game may be associated with the game server so that it can be executed by the game server or so that it the game code is accessible to (such as for download to) each server-based gaming machine.

In addition, because traditional gaming machines were custom-configured by their manufacturer, it was difficult for third parties to get new casino games implemented, thus limiting the number of new casino-style games which made it into the market. In particular, to even get a new game into the market, a developer of a new game generally had to have a gaming machine manufacturer develop the game for implementation on its own machines. However, even if the gaming machine manufacturer was willing to introduce the new game, given that all development was performed by the gaming machine manufacturer, the development time of the game could be many years.

An oft-stated advantage of the server-based gaming system that was frequently touted was that third parties would be able to easily create new games for implementation by the system. However, this has not generally been true. In particular, currently, each gaming machine manufacturer has developed their own unique and proprietary server-based platform/architecture which integrates the game and machine/system functions. This proprietary platform ensures, for example, that game code which is run at the gaming machine allows the gaming machine to both present game information but integrate with the various associated peripheral devices, systems and functions of the gaming machine.

This requires, however, that all game software be specifically coded for a specific manufacturer's platform. For example, an outside game content developer is required to code their game software to certain specifications so that it will run on one gaming manufacturer's platform (such as for presentation of the game at gaming machines at one casino) and then must code the same game software an entirely different way so that can be implemented on a different gaming manufacturer's platform (such as for presentation of the game at gaming machines at a different casino). This is time consuming and costly. In addition, this generally requires that the game developer turn their game code over to the system operator so that it can be integrated onto the game server, as illustrated in FIG. 1B. At that point, the game developer loses control of their game software. This makes it difficult for the game developer to know how and when their software is being used or to make changes to the software, such as to implement new and exciting game features.

SUMMARY OF THE INVENTION

Aspects of the invention comprise a server-based gaming system, gaming machines or terminals, an architecture for a server-based gaming system, and methods of playing and presenting server based games.

In one embodiment of the invention is a server-based gaming system which comprises a plurality of gaming machines or terminals, at least one gaming terminal control server or manager, and one or more game servers. In a preferred embodiment of the system, game processes and system/machine processes are separated. The gaming terminals have a separate game process layer and machine or system process layer.

In one embodiment of the invention, game information such as game outcome information, is generated by the game servers and transmitted to the gaming terminals. The game process layer utilizes the game information to present game information to the player, such as by displaying game information on a video display of the terminal. Importantly, the game process layer is configured to execute or utilize game information which is provided in a plurality of different protocols, such as one or more different non-proprietary protocols.

Machine or system processes at the gaming terminal are segregated from the game processes. In one embodiment, machine processes which are associated with the game are triggered by instructions which are transmitted from the game server to the terminal control server. The terminal control server preferably transmits control instructions (such as after a transaction) to the system process layer of the gaming terminal. The system process layer utilizes those instructions to control machine processes, such as to control peripherals at the gaming terminal.

At the same time, machine processes which are generated at the gaming machine and which relate to the game, such as a player input, are routed from the system process layer of the gaming terminal to the terminal control server. The terminal control server then routes information regarding such input or processes to the game server which is generating the game information (such as after a translation).

In accordance with the invention, integration of game processes and system or machine processes is accomplished via the terminal control server, rather than by having the game code be compatible with machine or control instructions. Thus, game content can be provided from different game servers which are associated with different game vendors. Each game vendor can generate and provide their own game code in accordance with one or more well known, public and/or non-proprietary protocols or configurations. Different vendors may supply game code which utilizes different protocols.

Further objects, features, and advantages of the present invention over the prior art will become apparent from the detailed description of the drawings which follows, when considered with the attached figures.

DETAILED DESCRIPTION OF THE INVENTION

In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

In general, the invention comprises a server-based gaming system, configurations of gaming machines or gaming terminals, an architecture for a server-based gaming system, and methods of playing and presenting server based games. In one configuration, the gaming system includes a plurality of gaming machines or terminals, at least one gaming terminal control server or manager and one or more game servers. In accordance with the architecture, game processes and system/machine processes are separated. This allows the gaming terminals to execute generic game code or game code configured in accordance with varying protocols, rather than a single, proprietary protocol.

Figure 1A:
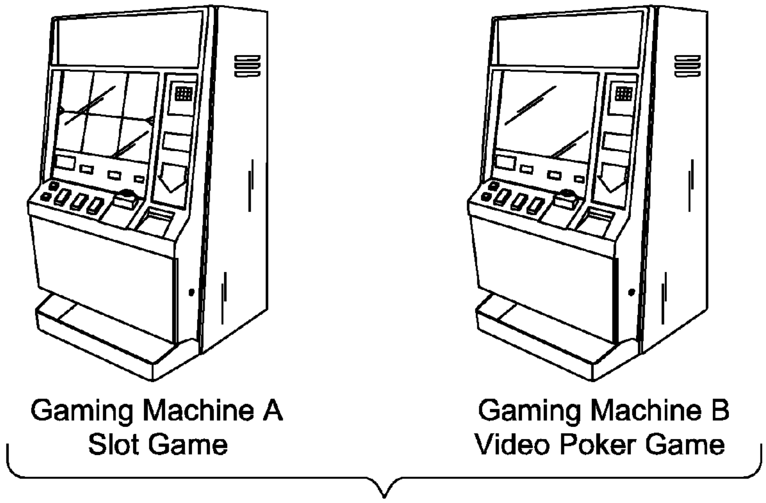
FIG. 1A illustrates stand-alone gaming machines in accordance with the prior art.
Figure 1B:
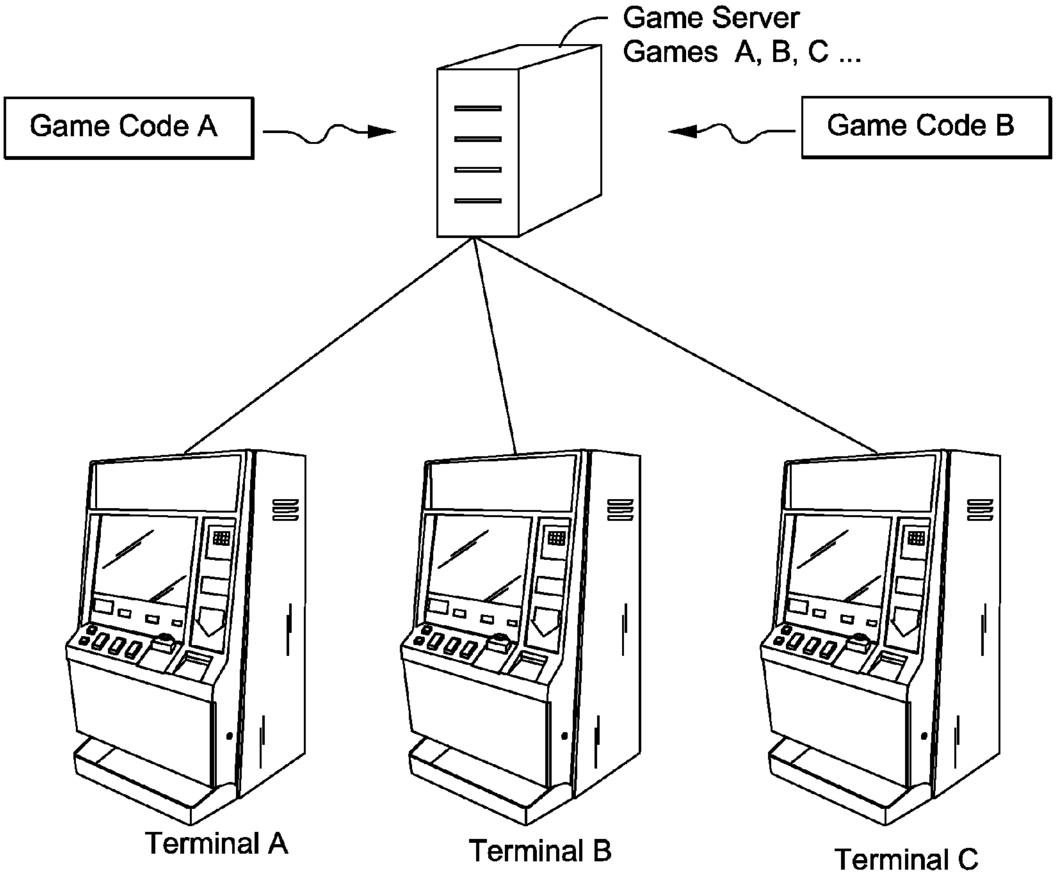
FIG. 1B illustrates one configuration of a server-based game system in accordance with the prior art.
Figure 2:
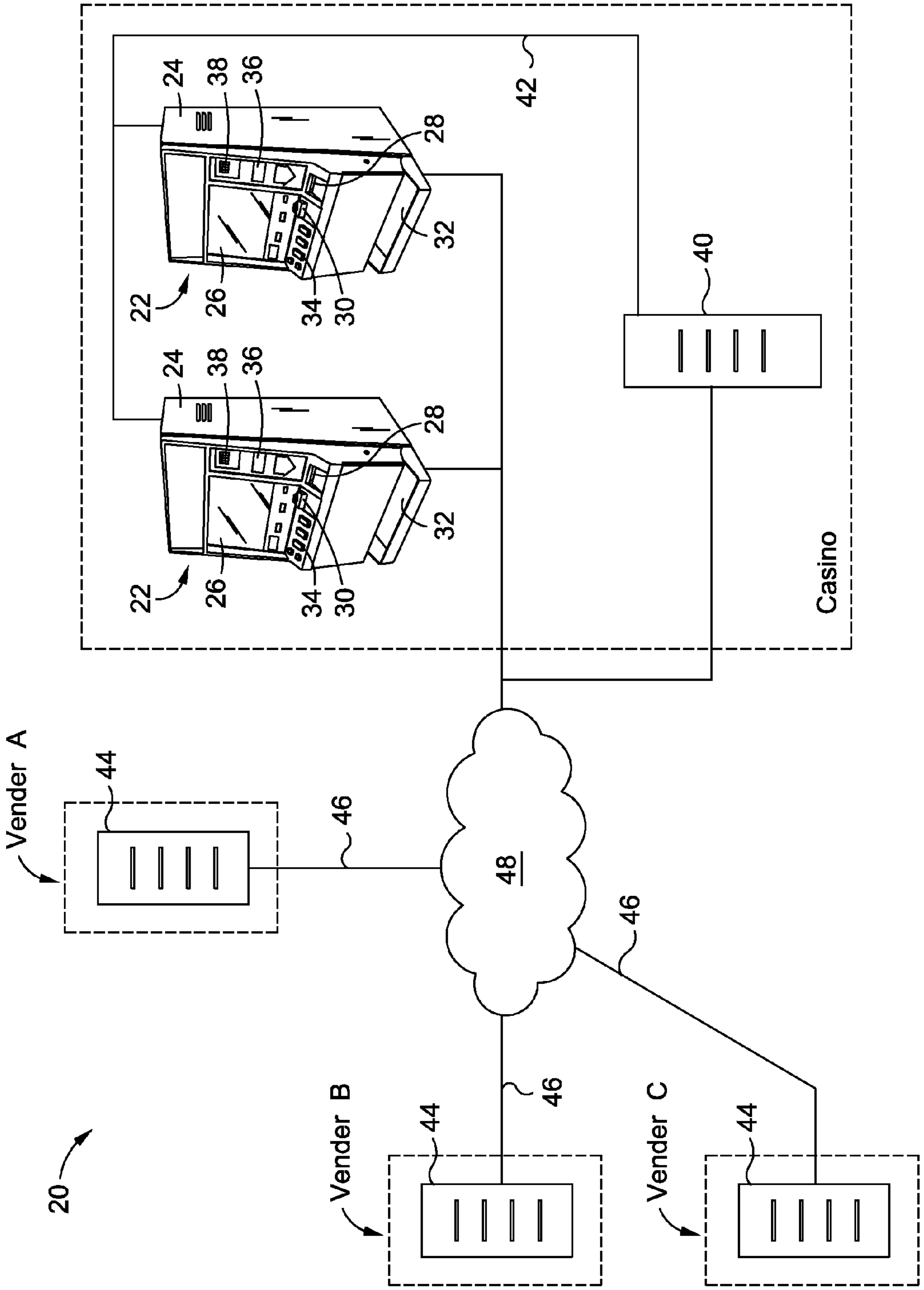
FIG. 2 is a block diagram of a gaming system in accordance with the present invention.

One embodiment of the present invention will be described with reference to FIG. 2. As illustrated, a gaming system 20 includes at least one gaming machine or terminal 22. In a preferred embodiment, the gaming terminals 22 are configured to present casino-style games, namely games which are played for a monetary wager (or monetary equivalent, such as credit) and which offer the potential to lose the wager (for a losing game outcome) or win winnings (for a winning outcome). As described below, such may comprise any of a variety of games now known or later developed, including slot-type games, video poker type games, and others.

The gaming terminal 22 may have a plurality of features. For example, the gaming terminal 22 may include a housing or cabinet 24 for enclosing/supporting various components of the terminal. The housing 24 may have a variety of configurations. In one embodiment, as illustrated, the housing 24 is configured so that the machine has an "upright" configuration. The casino gaming terminal 22 might also be configured as a "slant"-type, "bar-top" or have other forms.

In one embodiment, the gaming terminal 22 is preferably configured as a "video" type terminal, the terminal including at least one display 26 for displaying game information to a player. The gaming terminal 22 may include other means for providing information to a player. For example, speakers (not shown) or other devices may be provided for generating sound associated with the game. The gaming terminal 22 may also include lights, printed instructions and other displays/display devices.

As indicated above, the games presented by the gaming terminal are preferably wagering type games wherein a player must place a bet or wager in order to play the game for the opportunity to receive winnings. Preferably, if the player is a winner of the game, the player is provided an award, such as a monetary payout (such as coins), credits representing monetary value, points or tangible prizes. As illustrated, the gaming terminal 22 may thus include a bill validator/acceptor 28 for accepting paper currency and/or a coin acceptor 30 for accepting coins. Other means of payment, such as a credit card reader, may be provided. An award of winnings in the form of coins may be paid to the player via a coin tray 32.

Preferably, the gaming terminal 22 includes means for a player to provide input. In one embodiment, this means comprises one or more buttons. For example, one or more wager buttons 34 may be provided for a player to select the amount to bet on a particular game or make other game inputs, such as selecting cards to hold/discard or the like. Other means of input may be provided, such as a touch-screen display and other devices now known or later developed.

A game controller (not shown) is provided for controlling the various devices of the gaming machine and for generating game information. For example, the game controller may be arranged to generate video and audio data for presentation by the display and speakers of the gaming terminal 22. The game controller may be arranged to detect a signal from the coin acceptor indicating the receipt of coins or from the bill validator regarding accepted bills and for registering credits corresponding to those inputs, for subtracting credits for wagers placed by a player, and for causing a coin delivery mechanism to deliver coins from a coin hopper to the coin tray for payment of winnings and/or return to a player of unwagered credits. Preferably, the one or more player input devices provide an output to the gaming controller for use in play of the game. For example, in response to a "bet one" input by a player, the gaming controller is preferably transmitted a signal which causes the gaming controller to initiate presentation of the game.

The gaming terminal 22 may include one or more random number generators ("RNG") for generating random game events and results (such as cards used in a card game, slot symbol positions or the like). As described below, however, in other configurations the gaming terminal 22 need not contain a RNG, such as if a remote game server includes an RGN and generates the game results, or may have an RNG along with a remote server or other device.

As indicated, in one embodiment, game information is displayed by a video display 26 to a player. That display may be of a variety of types, including CRT, LCD, plasma and others. The gaming terminal 22 may also include more than one video display.

The gaming terminal 22 may have other configurations, including other features. For example, the gaming terminal 22 may include a player tracking device, such as a card reader 36 and associated keypad 38. Such player tracking devices are well known and may permit the game operator to track play of players of the gaming machine. The tracked play may be utilized to offer player bonuses or awards.

In one embodiment, the gaming terminal 22 may be configured to dispense media, such as printed paper tickets, magnetic stripe or RFID tagged-media which have associated value. For example, winnings or unused credits may be returned to the player via a printed ticket or card having value or associated value. In one embodiment, the gaming terminal 22 might also be configured to accept such media for providing credit for game play.

As indicated above, the gaming terminal 22 is preferably configured to present one or more casino-style games. Such games may comprise a variety of games which are currently known or which may be developed in the future. Such games include, but are not limited to, lottery, keno, bingo, poker, slot and other games.

In a preferred embodiment, as described in detail below, the gaming terminal 22 is configured to present one or more games based upon game information which is provided by at least one external device, such as an external game server. Depending upon the configuration of the system, the configuration of the gaming terminal 22 may vary. For example, if the external game server is configured to provide the gaming terminal 22 with executable game code or software, then the gaming terminal 22 preferably includes one or more data storage or memory elements for storing the code or software, a controller for executing the code and at least one random number generator for use in generating random game results. On the other hand, if the external game server were configured to generate game results and transmit those results to the gaming terminal 22 for presentation, the gaming terminal 22 might have another configuration (such as, for example, not including a random number generator).

It will be appreciated that the system may include a plurality of gaming terminals 22. For example, multiple gaming terminals 22 might be located on a casino floor. Of course, the gaming terminals 22 might be used in other environments, such as an airport, a bar or tavern or other locations.

As used herein, the term "gaming terminal" may also include other types of gaming machines or devices other than that described above. Such might comprise, for example, gaming tables. Such tables may be manually operated or be fully or partially automated. A variety of games may be offered at such tables. Of course, the gaming machines may include other types of devices as well, including hand-held, portable or other types of devices such as tablets, laptops and other electronic devices now known or later developed.

In one embodiment, the system 20 includes at least one gaming terminal control, such as a gaming terminal control server 40. Additional details regarding the terminal control server 40, including its functionality, are provided below. However, in one embodiment, the terminal control server 40 comprises a computing device which comprises at least one processor for receiving information, for processing information or executing code or software, and for generating an output, such as control instructions.

In one embodiment, the terminal control server 40 includes means for storing information or instructions. Such means may comprise one or more memory devices. Such might comprise RAM, ROM (including EPROM, EEPROM, PROM) or other devices now known or later developed. The terminal control server 40 might include one or more other memory devices, such as for storing game state information or the like, as detailed below. In one embodiment, the terminal control server 40 might comprise or be in communication with one or more mass data storage devices, such as one or more hard drives or the like.

The terminal control server 40 preferably also includes at least one communication interface, by which it may receive and transmit information. The communication interface(s) may permit communications in accordance with various protocols (TCP/IP, 802.11xx, etc.) and in various forms and over various types of links (wired and/or wireless).

The terminal control server 40 might actually comprise a system or network of a plurality of elements or devices. For example, the terminal control server 40 might comprise a network or system which includes multiple servers and related devices such as data storage devices, user interface features and the like. Such might comprise, for example, a user station which includes a video display and one or input devices (such as a keyboard, mouse or the like). Such a user station may permit an operator to interface with and manage or control the terminal control server 40, such as to change operator settings and the like. The terminal control server 40 might also comprise a router and one or more separate computing devices. The functions of the various computing devices might be segregated.

In a preferred embodiment, the one or more gaming terminals 22 are in communication with the at least one terminal control server 40 at one or more times. For example, the gaming terminals 22 and the at least one terminal control server 40 may be linked via one or more communication links 42. These communication links 40 may be wired and/or wireless and may be dedicated, shared, part of a LAN, WAN or other network.

In one embodiment, the system 20 also includes one or more game servers 44. As with the terminal control server 40, the game servers 44 preferably comprise computing devices which comprise at least one processor for receiving information, processing information or executing code or software, and generating an output, such as control instructions.

In one embodiment, each game server 44 includes means for storing information or instructions. Such means may comprise one or more memory devices. Such might comprise RAM, ROM (including EPROM, EEPROM, PROM) or other devices now known or later developed. In one embodiment, the game server 44 might comprise or be in communication with one or more mass data storage devices, such as one or more hard drives or the like.

The game server 44 preferably also includes at least one communication interface, by which it may receive and transmit information. The communication interface(s) may permit communications in accordance with various protocols (TCP/IP, 802.11xx, etc.) and in various forms and over various types of links (wired and/or wireless).

Each game server 44 might actually comprise a system or network of a plurality of elements or devices. For example, the game server 44 might comprise a network or system which includes multiple servers and related devices such as data storage devices, user interface features and the like. Such might comprise, for example, a user station which includes a video display and one or input devices (such as a keyboard, mouse or the like). Such a user station may permit an operator to interface with and manage or control the game server 44, such as to change operator settings and the like. The game server 44 might also comprise a router and one or more separate computing devices. The functions of the various computing devices might be segregated.

Although additional details of the game servers 44 are described below, in general, the game servers 44 are configured to provide the gaming terminals 22 with executable game code or software, game results and/or other game information for use by the gaming terminals 22 in presenting one or more games to one or more players.

In this regard, the one or more gaming terminals 22 are in communication with the one or more game servers 44 at one or more times. For example, the gaming terminals 22 and the one or more game servers 44 may be linked via one or more communication links 46. These communication links 46 may be wired and/or wireless and may be dedicated, shared, part of a LAN, WAN or other network, including the Internet 48.

As described below, a particular advantage of the invention is that it permits different game vendors to present games on gaming terminals 22 which belong to a third party. For example, relative to the system 20 illustrated in FIG. 2, a plurality of gaming terminals 22 may be located on the floor of a casino. The gaming terminals 22 may be owned or leased by the casino. Likewise, those gaming terminals 22 may be linked the one or more terminal control servers 40 which are located at the casino, such as in a back room.

In one configuration, the gaming terminals 22 and at least one terminal control server 40 may be supplied by a particular gaming manufacturer and thus have particular operating characteristics. In accordance with the invention, one or more of the game servers 44 may be provided by the gaming manufacturer or casino or be operated by the gaming manufacturer or casino. Most importantly, however, one or more of the game servers 44 may be operated by one or more third party vendors (other than the casino or manufacturer/operator of the gaming terminals 22 and terminal control server 40). For example, as illustrated in FIG. 2, a Vendor A may operate a first game server, a Vendor B may operate a second game server and a Vendor C may operate a third game server. Each of these vendors may develop and supply their own game code to the gaming terminals 22, whereby each vendor's games may be presented on those terminals.

Additional aspects of the system will be described with reference to FIG. 3. In accordance with a preferred embodiment of the invention, the system 20 is configured so that the game processes and system or machine processes associated with a gaming terminal 22 are segregated. In general, this permits the game processes to be independent from the system processes. As described below, this has numerous advantages.

Figure 3:
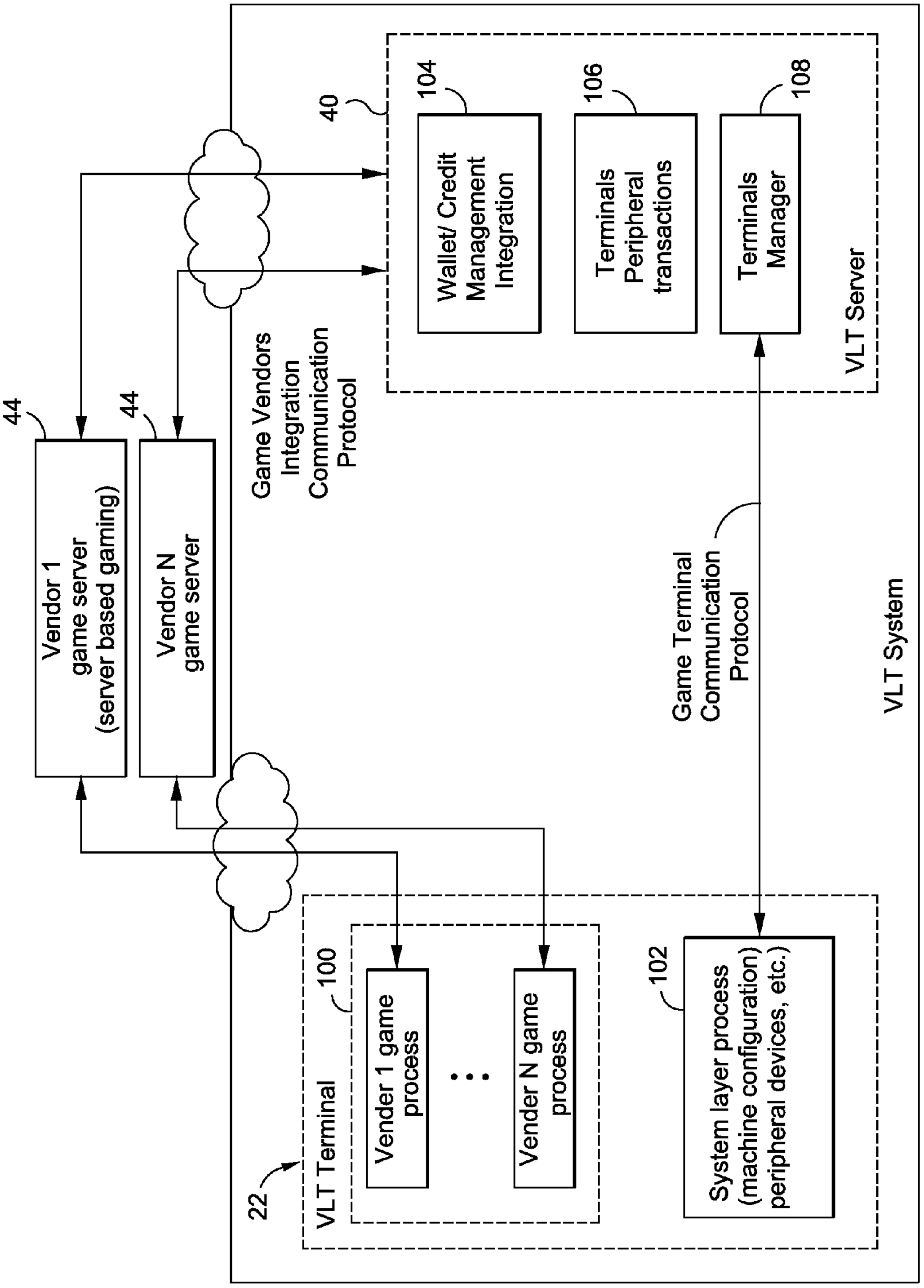
FIG. 3 diagrammatically illustrates operation of a gaming system in accordance with the present invention.

As illustrated in FIG. 3, a gaming terminal 22 has a game process layer 100. The game process layer 100 may be implemented as hardware or software, such as by software which is executed by the gaming controller of the gaming terminal 22. In one embodiment, the game process layer 100 comprises a platform which permits the gaming terminal 22 to execute game code in a variety of formats, configurations or protocols, such as well-known generic formats or configurations such as Adobe FLASH, HMTML x, and others. Preferably, the game process layer 100 is configured to execute or implement game code for presenting a game, including generating game information for presentation to the player of the gaming terminal. Such information may comprise, for example, image information for display by the video display of the gaming terminal.

The gaming terminal 22 also has a system process layer 102. The system process layer 102 may be implemented as hardware or software, such as by software which is executed by the gaming controller of the gaming terminal 22. In one embodiment, the system process layer 102 comprises a platform for controlling the gaming terminal 22 and executing game-supporting functionality. As described below, such may comprise the control of the various peripheral devices of the gaming terminal 22 (such as the buttons 34, card reader 36, bill validator 28 such as illustrated in FIG. 2), executing accounting, player tracking and other functions, such as tracking monetary credits at the gaming terminal 22, executing "cash-out" and other functions which are associated with the operation of the gaming terminal 22.

As illustrated, game code or game information may be provided to the gaming terminal 22 by a plurality of vendors. For example, a Vendor 1 may utilize a game server 44 for providing game code or game information corresponding to one or more Vendor 1 games. Likewise, other vendors may utilize one or more game servers 44 for providing game code or game information corresponding to their games.

In a preferred embodiment, the game information includes information regarding the outcomes of one or more games. In particular, game outcomes are preferably generated by the game servers 44 and are transmitted to the gaming terminals 22. The gaming terminal 22 uses the outcome information to present the one or more games. As one example, a vendor may transmit base game information regarding a game from their game server 44 to a gaming terminal 22. Such information might comprise the images of cards, slot symbols or other indicia, entire page displays, graphical user interface information or the like. The gaming terminal 22 may utilize such game information, along with game outcome information, to display or present a game to a player. For example, a game server 44 may transmit image files corresponding to a game interface and various cards. The game server 44 may also transmit a game outcome, such as data which represents the game outcome of a "Full House" win comprising the cards "A♦, A♥, K♣, K♥, K♠" to the gaming terminal 22. The game process layer 100 of the gaming terminal 22 may utilize that game outcome information and the card image information to display those cards on the display of the game terminal to the player.

In a preferred embodiment of the invention, each vendor's game code corresponding to one or more games may be downloaded to the gaming terminal 22, such as via the above-described communication link 46. That game code is preferably associated with the game process layer 100 of the gaming terminal 22. As illustrated in FIG. 3, a gaming terminal 22 may thus have the game code from multiple different vendors associated with its game process layer 100.

Most importantly, the vendor's game code does not have to be coded in accordance with a proprietary gaming machine protocol or a protocol which makes the game code compatible with the system protocol or functionality of the gaming terminal 22. Instead, the vendor's game code may merely be coded in accordance with one or more generic and/or widely recognized protocols. Further, the gaming terminal 22 may accept game code from different vendors, which sets of game code are not coded in accordance with the same protocol. For example, Vendor A's game code may operate using Adobe FLASH protocol while Vendor B's game code may operate using HTML x protocol.

In a preferred embodiment of the invention, the game process layer 100 and the system process layer 102 are not linked at the gaming terminal 22. Instead, integration of the game and system functionality occurs at or via the terminal control server 40.

As illustrated in FIG. 3, the system process layer 102 of the gaming terminal 22 communication with the terminal control server 40. In a preferred embodiment, the system process layer 102 may implement or employ a proprietary protocol, such as a gaming terminal system control and communication protocol. This protocol is preferably compatible with the terminal control server 44.

As also illustrated in FIG. 3, the game process layer 100 of the gaming terminal 22 also communicates with the terminal control server 40. As illustrated, such communications are preferably via the vendor's game server 44. In one embodiment, the communications are according to an "integration" protocol or the communications are "translated" at the terminal control server 40.

For example, in one embodiment, Vendor 1 may code their game code in accordance with an HTML x protocol. When a Vendor 1's game is presented at a gaming terminal 22, the gaming terminal 22 may communicate game activities to Vendor 1's game server 44. Vendor 1's game server may implement a translation engine which translates the game activity information into a standardized integration protocol. That translated information may then be transmitted to the terminal control server 40 for use by the terminal control server 40 in controlling the gaming terminal via the system process layer 102 of the gaming terminal 22.

Of course, each vendor may employ a different translation engine or more than one translation engine which permits their particular game code to integrate with the terminal control server 40.

In another embodiment, direct communications could occur between the game process layer 100 of the gaming terminal 22 and the terminal control server 40. In such a configuration, the terminal control server 40 could employ or implement one or more translation engines. For example, activity information relating to a game which is implemented via HTML x protocol might be translated with a first engine or translator at the terminal control server 40, while that which is implemented by Adobe FLASH protocol might be translated with a second engine or translator at the terminal control server 40.

Most importantly, as indicated above, the game and system activities associated with the gaming terminal 22 are linked at the terminal control server 40. A variety of examples will illustrate this aspect of the invention.

As one example, Game A belonging to Vendor 1 may be implemented by the game process layer 100 of the gaming terminal 22. As a result of a game win of that game, the player may be awarded 500 monetary credits. As will be appreciated, the game code which is executed in the game process layer 100 may present the game win and winning award. The winning outcome and award may be determined by Vendor 1's game server 44. Vendor 1's game server 44 may translate the 500 credit win and transmit that information to the terminal control server 40 (or such information might be transmitted to the terminal control server and then be translated). The terminal control server 40 may utilize this information to transmit a control instruction (using a gaming terminal communication protocol) to the system process layer 102 of the gaming terminal 22, such as to cause the gaming terminal 22 to indicate a new credit balance on the video display of an additional 500 monetary credits.

As another example, a player may wish to play Game B belonging to Vendor 2. During the game the player may be required to provide input regarding a selection of one or more playing cards. The player may depress a button of the gaming terminal 22. This input may be detected by the system process layer 102 of the gaming terminal 22 and then be transmitted to the terminal control server 40. The terminal control server 40 may either translate the input or transmit that input to Vendor 2's game server 44, at which point the input is translated to the appropriate game protocol and then transmitted to the game process layer 100 of the gaming terminal 22. The game may thus accept the player's input and, in response to that input present the next portion of the game.

It will be appreciated that a wide variety of features and functions may be implemented in the above-described fashion and that the terminal control server 40 may include various engines or managers for integrating the game and system functions. For example, as illustrated in FIG. 3, the terminal control server 40 may include a wallet/credit management engine 104, a peripheral management engine 106 and a main manager engine 108. The wallet/credit management engine 104 may, for example, translate and manage monetary actions associated with the gaming terminal 22, including acceptance of currency, coins, monetary value tickets, coded financial cards, or other financial instruments or devices, the wagering of credits by a player and the award of winnings as a result of game play or otherwise. The peripheral management engine 106 may manage or control the various peripheral devices of each gaming terminal 22, including the displays, buttons, touch-screens, bill validators, card readers, scanners, currency issuing devices, keypads and other devices. Such engines may comprise combinations of hardware and/or software, such as a main processor which executes software modules corresponding to each of said engines.

It will be appreciated that the system 20 and the various elements thereof may have various configurations in accordance with the invention. For example, while the system 20 illustrated in FIGS. 2 and 3 have third party vendor servers 44, it is possible for the casino or gaming terminal or system manufacturer to also operate one or more game servers for providing game content. For example, a casino might operate their own game server to enable the casino to direct associate their own games with their gaming terminals 22 (such as in addition to games which are offered by third party vendors).

The system 20 might also include a variety of additional features or elements or connect to other devices or systems. For example, a casino may operate a player tracking system which utilizes one or more player tracking servers to track player game play, as is well known in the art. The terminal control server 40 may communicate with a player tracking server or system, such as to report aspects of player game play at a gaming terminal 22. As another example, a casino may operate an accounting system which includes one or more accounting servers to track monetary amounts which are provided to gaming terminals 22, credits which are wagered, credits which are won and/or the movement of credits or monies between gaming terminals 22. Once again, the terminal control server 40 may communicate with such a server or system, such as to report a player's wagering of credits at a gaming terminal 22 or the award of winnings to a player as a result of game play.

As indicated above, the invention has application to gaming terminals 22 other than casino-style gaming machines. For example, the system of the invention may be utilized to present one or more games to a player who is utilizing a mobile or portable electronic device. Such devices might include, but are not limited to, a laptop, PDA or tablet. In one configuration, a player may download game code which enables the mobile or portable electronic device to present games in similar fashion to that described above (in such a configuration, the mobile or portable electronic device may have one or more wireless communication links to other devices, such as to a game server and a terminal control server.

In one embodiment, a casino, hotel or other entity might provide such devices to players, such as by checking them out at a front desk or the like. Further, such entities might cause other information to be presented to players. For example, a hotel might operate its own server 44. A player using a hotel tablet might access games from multiple third party vendors. At the same time, the hotel may utilize their server 44 to present music, hotel information or other media to the player.

As indicated above, the gaming terminal 22 may be linked to a player tracking server or system, such as through the terminal control server 40. Of course, the same may be true if the gaming terminal 22 comprises such a handheld or mobile electronic device. For example, such a handheld or mobile electronic device could link to a player tracking system or server via a communication link with the terminal control server 40 or via another communication link and/or interface. In such a configuration, the handheld or mobile communication device could be multi-functional to serve as both a player tracking device and present one or more games via the remote game servers 44 (for example, the handheld or mobile communication device may be linked to or identify a specific player, whereby any play of games by the player using the device thus identifies the player; further, player rewards, promotions and the like may be directed to the player by directing such to the handheld device which is assigned to that player).

In one embodiment, the system and method of the invention may be utilized to permit a player to play more than one game at a time (i.e. two or more games simultaneously or overlapping in time). Further, those games might be provided by two or more different game vendors. For example, a single player at a gaming terminal 22 might simultaneously play a first game associated with a first game vendor and a second game associated with a second game vendor (wherein, as described above, game information regarding the two games may be provided by two separate game servers 44 to the single gaming terminal 22).

Regardless of the configurations of the gaming terminals 22 (i.e. whether they are casino-style gaming machines, mobile electronic devices, kiosks or the like), management of credit or monetary value transactions may be centralized. As indicated above, the monetary value transaction management (tracking of monies input to the gaming terminals 22, credits wagered and won by players at the gaming terminals 22, monetary value or credits which are associated with player accounts when such accounts exist, etc.) may all be centralized at the terminal control server 40. As indicated above, the terminal control server 40 may directly manage monetary value transactions, such as via a wallet/credit management engine 104. In other embodiment, all monetary value transaction information may be routed through the terminal control server 40 to one or more external management devices, such as an existing casino accounting system or a third party accounting system or the like.

The system of the present invention has numerous advantages over the prior art. First and foremost, the gaming system and gaming terminals do not require vendors to create and supply game code in accordance with a proprietary and unique platform or turn over their game code to the operator of the system so that their code can be modified for use on the system. Instead, game vendors can generate and provide game code in accordance with one or more well known, public and/or non-proprietary protocols or configurations. In fact, different vendors may supply game code which utilizes different protocols. This is highly advantageous for a number of reasons. First, a game vendor can generate game code using well known protocols rather than unique and proprietary protocols. This results in substantial time savings because the game vendor need not learn a new and proprietary protocol or be required to create their game code in multiple variations using different protocols for different applications. Second, the vendor's game code can be used in conjunction with different gaming terminals and systems without having to be generated in multiple formats. For example, the vendor might create game code using Adobe FLASH for an online implementation and then provide that same game code for use on the gaming terminals of the present invention (without having to re-write the original game code to conform to some unique and different protocol just so the game can be offered on a gaming machine).

In addition, in accordance with the invention, the game vendor does not lose control of their game code. As a first aspect, the vendor's game code (or just game information associated therewith) can be directly provided by the vendor to the gaming terminals. As a second aspect, in a configuration where the gaming terminals report game activity through the vendor to the terminal control server, the vendor is able to store, view and/or audit game activity associated with their game code. For example, the vendor can then track how many times their games are played at each gaming terminal, the size of the player wagers, amounts won or lost, etc.

It will be understood that the above described arrangements of apparatus and the method there from are merely illustrative of applications of the principles of this invention and many other embodiments and modifications may be made without departing from the spirit and scope of the invention as defined in the claims.

What is claimed is:

1. A gaming system comprising:

at least one gaming terminal, said gaming terminal comprising:

a housing;

at least one display device configured to display wagering game information;

one or more peripheral component; and at least one controller comprising a game process layer configured to implement game features and a separate system process layer configured to control said terminal, including said peripheral component;

and at least one terminal control server, said at least one terminal control server configured to transmit gaming terminal control instructions to said at least one gaming terminal for use by said system process layer of said at least one gaming terminal in controlling said terminal, including said peripheral components thereof, in response to information regarding said game presented at said at least one gaming terminal, wherein said terminal control server is configured to receive said information regarding said game from a game server.

2. The gaming system in accordance with claim 1 further comprising at least one game server, said game server configured to generate game information and transmit said game information to said at least one gaming terminal for use by said game process layer in presenting said wagering game to said player.

3. The gaming system in accordance with claim 2 wherein said game process layer is configured to utilize game information which is provided in a plurality of protocols.

4. The gaming system in accordance with claim 1 wherein said game process layer is configured to utilize game information which is provided in the plurality of protocols from a plurality of different game vendor servers.

5. The gaming system in accordance with claim 1 wherein said game process layer and said system process layer are implemented as machine readable code executed at a processor of said gaming terminal.

6. A method of presenting a wagering game to a player of a server-based gaming terminal comprising:

receiving game information provided by a game server at said gaming terminal, said game information including at least a result of said wagering game generated by said game server;

utilizing a game process layer of said gaming terminal to present said game information via at least one display of said gaming terminal to said player;

transmitting gaming terminal control instructions from a terminal control server;

receiving said gaming terminal control instructions at said gaming terminal;

utilizing a system process layer of said gaming terminal to control one or more peripheral devices of said gaming terminal using said gaming terminal control instructions; and transmitting player input instructions from said system process layer of said gaming terminal to said terminal control server for use by said game server in generating said game information.

7. The method in accordance with claim 6 wherein said game information comprises images of cards or other game symbols.

8. The method in accordance with claim 6 further comprising the step of receiving player input instructions via a peripheral device of said gaming terminal at said system process layer.

9. A gaming system comprising:

a plurality of game servers which are configured to generate game information, said game information comprising at least information regarding an outcome of a game, at least two of said game servers configured to generate game information in accordance with at least two different protocols;

at least one gaming terminal configured to:

process game information received from said plurality of game servers via a game process layer and present said game information to a player thereof utilizing at least one display device; and control machine components of said gaming terminal via a system process layer, including receiving player input to said gaming terminal via one or more peripheral devices and provide output to said player via said one or more peripheral devices;

at least one terminal control server, said terminal control server configured to communicate with said system process layer of said at least one gaming terminal and said plurality of game servers to provide player input instructions relating to a game being presented at one of said gaming terminal to the associated game server for use by said game server in generating said game information, and for receiving game information from said game server for use in generating gaming terminal control instruction for use by said system process layer of said gaming terminal to control said gaming terminal; and at least one communication link between said plurality of game servers and said at least one gaming terminal, at least one communication link between said plurality of game servers and said at least one terminal control server, and at least one communication link between said plurality of gaming terminals and said at least one terminal control server.

10. The gaming system in accordance with claim 9 wherein said player input to said gaming terminal comprises a wager, said system process layer is configured to send information regarding said input to said terminal control server and said terminal control server is configured to transmit information regarding said wager to one of said game servers.

11. The gaming system in accordance with claim 9 wherein said game process layer and said system process layer at said gaming terminal are implemented by at least one processor of said gaming terminal.

12. A gaming system comprising:

at least one gaming terminal, said gaming terminal comprising:

a housing;

at least one display device configured to display wagering game information;

one or more peripheral component; and at least one controller comprising a game process layer configured to implement game features and a separate system process layer configured to control said terminal, including said peripheral component;

and at least one terminal control server, said at least one terminal control server has game activity information, is configured to communicate with at least one game server and is configured to transmit gaming terminal control instructions to said at least one gaming terminal for use by said system process layer of said at least one gaming terminal in controlling said terminal, including said peripheral components thereof, in response to information regarding said game presented at said at least one gaming terminal.

13. The gaming system in accordance with claim 12, said game server configured to generate game information and transmit said game information to said at least one gaming terminal for use by said game process layer in presenting said wagering game to said player.

14. The gaming system in accordance with claim 13 wherein said game process layer is configured to utilize game information which is provided in a plurality of protocols.

15. The gaming system in accordance with claim 12 wherein said game process layer is configured to utilize game information which is provided in the plurality of protocols from a plurality of different game vendor servers.

16. The gaming system in accordance with claim 12 wherein said terminal control server is configured to receive said information regarding said game from a game server.

17. The gaming system in accordance with claim 12 wherein said game process layer and said system process layer are implemented as machine readable code executed at a processor of said gaming terminal.

18. A method of presenting a wagering game to a player of a server-based gaming terminal comprising:

receiving game information provided by a game server at said gaming terminal, said game information including at least a result of said wagering game generated by said game server;

utilizing a game process layer of said gaming terminal to present said game information via at least one display of said gaming terminal to said player;

transmitting gaming terminal control instructions from a terminal control server, said terminal control server has game activity information and is configured to communicate with said game server;

receiving said gaming terminal control instructions at said gaming terminal;

utilizing a system process layer of said gaming terminal to control one or more peripheral devices of said gaming terminal using said gaming terminal control instructions; and transmitting player input instructions from said system process layer of said gaming terminal to said terminal control server for use by said game server in generating said game information.

19. The method in accordance with claim 18 wherein said game information comprises images of cards or other game symbols.

20. The method in accordance with claim 18 further comprising the step of receiving player input instructions via a peripheral device of said gaming terminal at said system process layer.

21. A gaming system comprising:

a plurality of game servers which are configured to generate game information, said game information comprising at least information regarding an outcome of a game, at least two of said game servers configured to generate game information in accordance with different protocols;

at least one gaming terminal configured to:

process game information received from said plurality of game servers via a game process layer and present said game information to a player thereof utilizing at least one display device; and control machine components of said gaming terminal via a system process layer, including receiving player input to said gaming terminal via one or more peripheral devices and provide output to said player via said one or more peripheral devices;

at least one terminal control server, said terminal control server has game activity information and is configured to communicate with said system process layer of said at least one gaming terminal and said plurality of game servers to provide player input instructions relating to a game being presented at one of said gaming terminal to the associated game server for use by said game server in generating said game information, and for receiving game information from said game server for use in generating gaming terminal control instruction for use by said system process layer of said gaming terminal to control said gaming terminal; and at least one communication link between said plurality of game servers and said at least one gaming terminal, at least one communication link between said plurality of game servers and said at least one terminal control server, and at least one communication link between said plurality of gaming terminals and said at least one terminal control server.

22. The gaming system in accordance with claim 21 wherein said player input to said gaming terminal comprises a wager, said system process layer is configured to send information regarding said input to said terminal control server and said terminal control server is configured to transmit information regarding said wager to one of said game servers.

23. The gaming system in accordance with claim 21 wherein said game process layer and said system process layer at said gaming terminal are implemented by at least one processor of said gaming terminal.

* * * * *